US008396765B2

(12) United States Patent
Santarlas

(10) Patent No.: US 8,396,765 B2
(45) Date of Patent: Mar. 12, 2013

(54) SYSTEM AND METHOD FOR THE AUTOMATED DISTRIBUTION, MANAGEMENT AND SERVICE OF COURT-RELATED DOCUMENTS

(76) Inventor: Thomas E. Santarlas, Wauchula, FL (US)

( * ) Notice: Subject to any disclaimer, the term of this patent is extended or adjusted under 35 U.S.C. 154(b) by 0 days.

(21) Appl. No.: 12/906,099

(22) Filed: Oct. 17, 2010

(65) Prior Publication Data

US 2012/0095889 A1   Apr. 19, 2012

Related U.S. Application Data

(63) Continuation-in-part of application No. 12/905,702, filed on Oct. 15, 2010, now abandoned.

(51) Int. Cl.
*G07F 19/00* (2006.01)
*G06K 9/20* (2006.01)
(52) U.S. Cl. ......................................................... 705/34

(58) Field of Classification Search .................... 705/34
See application file for complete search history.

(56) References Cited

U.S. PATENT DOCUMENTS

| 5,134,669 A * | 7/1992 | Keogh et al. ................. 382/318 |
| 2007/0112584 A1* | 5/2007 | Rosenthal et al. ............... 705/1 |
| 2010/0211515 A1* | 8/2010 | Woodings et al. ............ 705/320 |

* cited by examiner

*Primary Examiner* — Garcia Ade
(74) *Attorney, Agent, or Firm* — GrayRobinson, P.A.; Michael J. Colitz, III

(57) ABSTRACT

Disclosed is a system and method for managing, distributing, and serving court-related documents. The system is operated by a host and utilized by a number of different entities that are involved in effecting service of court-related documents such as summonses, subpoenas, complaints, petitions and warrants. By way of the system, these court-related documents can be electronically distributed and ultimately served in an efficient manner. The system also permits the automated invoicing and billing for service related activities. The archiving of data related to effecting service can also be carried out by the present system.

3 Claims, 5 Drawing Sheets

| Documents | Job Id | Client | Server | Person/Corp to Serve |
|---|---|---|---|---|
| A F I RS MA V | 0000000164 | Smith and Jones | Process Servers Unlimited | ACME, Inc. |
| A F I RS MA V | 0000000166 | Clark Law Firm | Due Process, Inc. | Apex Corp. |
| A F I RS MA V | 0000000105 | Smith and Jones | Frank Johnson | Best Corp, Inc. |
| A F I RS MA V | 0000000178 | Able and Baker PA | Phil Brown | Al Moore |
| A F I RS MA V | 0000000342 | Law Firm of Alice Watkins | Speedy Process Servers, Inc. | Eric Moore |
| A F I RS MA V | 0000000865 | Smith and Jones | Process Servers R US LLC | Bill's Supermarket |
| A F I RS MA V | 0000000458 | Clark Law Firm | Mike Miller | Felix Hernandez |
| A F I RS MA V | 0000000912 | Smith and Jones | Sally Taylor | Ron Wright & Sons |

FIG. 5

SYSTEM AND METHOD FOR THE AUTOMATED DISTRIBUTION, MANAGEMENT AND SERVICE OF COURT-RELATED DOCUMENTS

CROSS REFERENCE TO RELATED APPLICATION

This applications claims priority to and is a continuation-in-part of U.S. patent application Ser. No. 12/905,702 filed on Oct. 15, 2010 and entitled "System And Method For The Automated Distribution, Management And Service Of Court-Related Documents." The contents of this co-pending application are fully incorporated herein for all purposes.

BACKGROUND OF THE INVENTION

1. Field of the Invention

This invention relates to an automated system for the service of court-related documents. More particularly, the present invention relates to a system for electronically distributing, managing and serving court-related documents.

2. Description of the Background Art

Serving documents such as summonses, complaints, subpoenas, petitions, and warrants upon third parties can be both time consuming and complicated for legal professionals. Effecting service of process has traditionally involved first generating the necessary documents to be served. This requires a detailed knowledge of the rules and regulations in the jurisdiction where the documents are to be served. Often times the legal professional must conduct research to discover these rules and regulations.

Depending upon the nature of the service, the legal professional may also have to get the court in the applicable jurisdiction to certify the documents or issue a summons. This, in turn, requires the legal professional to correspond with the clerk of court, often times via local counsel. Once the documents have been certified, the legal professional must find an individual to hand deliver the documents upon the third party. Finding a reliable process server may be a hit or miss proposition, insomuch as the legal professional may have little familiarity with the jurisdiction in which service is to be effected.

Despite recent advances in computer technology and electronic communications, many of the steps outlined above have remained unchanged. Thus, there exists a need in the legal field for a means of easily and efficiently carrying out service of process. There also exists a need in the field for a system whereby court-related documents can be electronically distributed, managed and, ultimately, served. There is likewise a need for a system for efficiently invoicing for tasks carried out by a process server. Finally, there exists a need for archiving all data associated with effecting service. The system and method of the present invention is aimed at meeting these and other needs.

SUMMARY OF THE INVENTION

It is therefore one of the objectives of this invention to provide a system for the automated service of court-related documents.

It is also an object of this invention to provide a system for electronically distributing and managing court-related documents prior to being served.

Still another object of this invention is to automate the invoicing associated with tasks carried out by a process server.

A further object of this invention is to enable all data associated with effecting service to be archived for later retrieval.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 5 is a screen shot of a program carrying out the archiving feature of the present invention Similar reference characters refer to similar parts throughout the several views of the drawings.

DETAILED DESCRIPTION OF THE PREFERRED EMBODIMENT

The present invention relates to a system and method for managing, distributing, and serving court-related documents. The system is operated by a host and utilized by a number of different entities that are involved in effecting service of court-related documents such as subpoenas, summonses, complaints, petitions, and warrants. By way of the system, these court-related documents can be electronically distributed and ultimately served in an efficient manner. The system also permits the automated invoicing and billing for service related activities. The archiving of data and/or files related to effecting service can also be carried out by the present system. The details of the present invention are more fully explained hereinafter.

Figure 1:
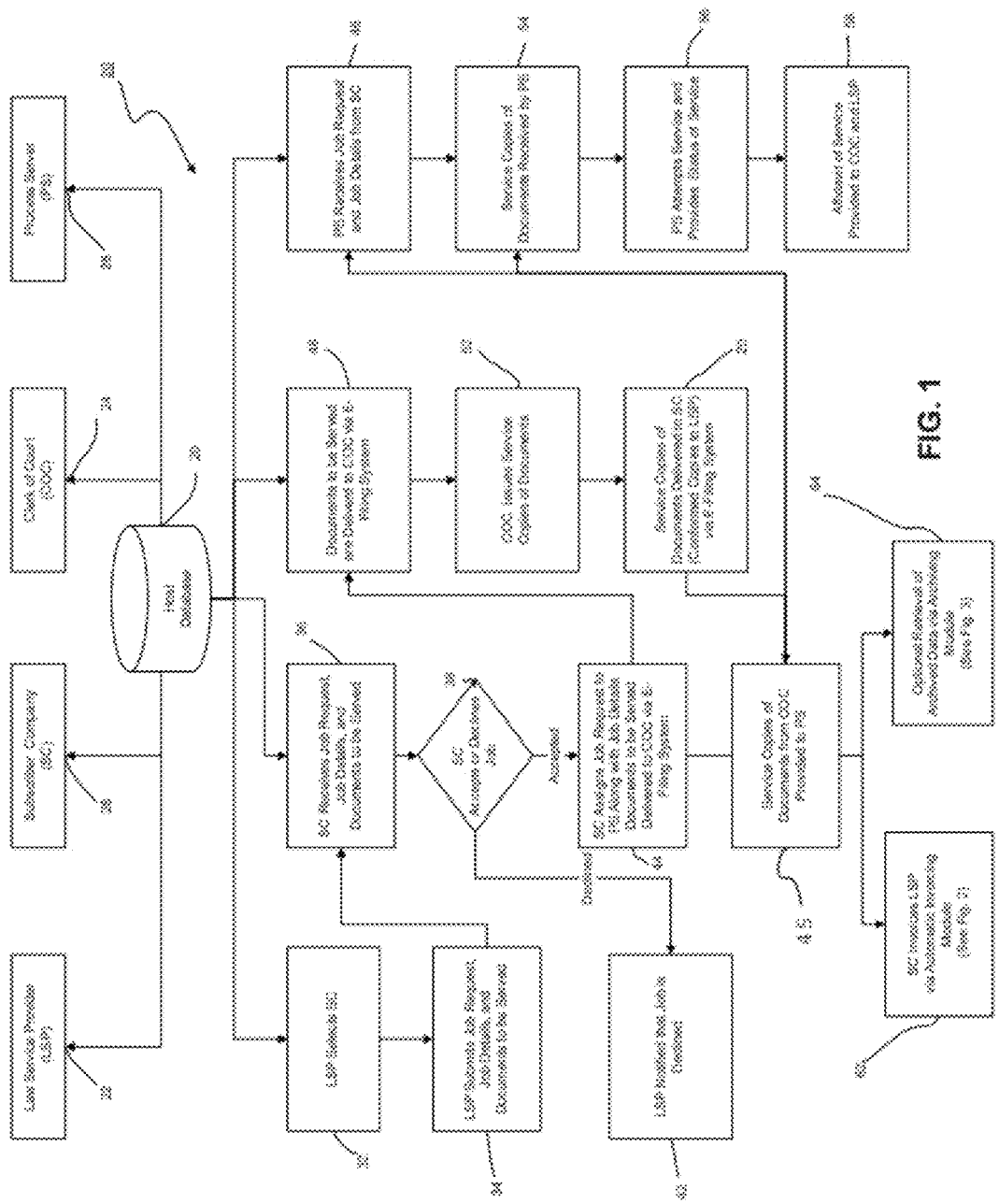
FIG. 1 is a flow chart illustrating the system of the present invention.

FIG. 1 is a flow chart illustrating the system 20 of the present invention as well as the various entities utilizing the system. These entities include law service providers (LSP) 22, which may include, for example, attorneys, law firms, paralegals, legal secretaries, and/or any other individuals or entities that generate, or assist in creating court-related documents. For purposes of this application, LSP's include, but are not limited to, any client of the subscriber companies described below. Although these clients will often be attorneys or law firms, the LSP definition specifically includes non-law firm corporations, non-attorney individuals, other corporate entities, or individuals representing themselves in a pro-se capacity. Other entities utilizing the system include clerks of court (COC) 24, which broadly includes any government-authorized individuals or entities that are involved in certifying court-related documents or in issuing summonses, or other related documents. For instance, COCs may be involved in providing a summons associated with a complaint or in certifying subpoenas or warrants.

The system may also be used by subscriber companies and process servers. Subscriber companies (SC) 26 are service providers that are involved in the service of court-related documents. This may be, for example, a company that oversees and manages a number of different process servers, either as employees or independent contractors. Finally, the process server (PS) 28 is the individual, or individuals, who are involved in actually effecting service of process. A PS may work as an employee or independent contractor for a particular SC. Alternatively, in some instances, the SC and the PS may be one and the same. Namely, SCs are defined herein as including a PS operating individually.

With continuing reference to FIG. 1, it is seen that the entire system is carried out over a computer network, such as the Internet. Alternatively, the network may comprise a Local Area Network, a Wireless Local Area Network, a Wide Area Network, or a Metropolitan Area Network. The system is also carried out over existing Internet-based, court-sponsored e-filing systems. An example of such a system is the CM/ECF e-filing system currently in place by the U.S. Federal Court System.

In accordance with the step 32 of the system, the LSP selects a particular SC. The LSP then submits a job request, job details, and documents to be served at step 34. At step 36, the SC receives the job request, job details, and court-related documents from the LSP over the network. The job request lists the general details of what the LSP is attempting to accomplish. The job request can be, for example, a request to serve a summons and complaint, or serve a subpoena or warrant. The job details provide further specifics regarding the individual or entity to be served, any applicable deadlines for service, as well as the geographic location for effecting service. Finally, the SC would receive copies of the court-related documents to be served from the LSP via the network. Again, these court-related documents may be a summons, complaint, subpoena, or a warrant. However, those knowledgeable in the legal industry will realize that there are additional court-related documents that have not been specified that could be employed in conjunction with the present invention.

In the next step 38, the SC, after reviewing the job details and the court-related documents, can either elect to accept or decline the job. The job may be declined, for instance, if the SC cannot meet the applicable deadline or if the job details specify a geographic area in which the SC does not operate. The LSP is then notified via the network whether the SC has declined or accepted the job request. In the event that the job is declined, as at step 42, the LSP can select another SC and begin the process anew.

Alternatively, if the SC accepts the job, the SC thereafter assigns the accepted job to a particular PS at step 44. It is envisioned that, in accordance with this system, the SC would maintain a database of numerous PS' in various geographic areas. Thus, the SC would select the most suitable PS and assign him or her the job request. Additionally, as explained below, the SC would also submit the court-related documents to the COC via the court sponsored e-filing system at step 48. The LSP may alternatively provide the court-related document to the COC, if such a submission is required by the court. Once issued, the service copies of the court-related documents would be provided to the SC with a conformed copy to the LSP. The SC then provides the PS with the job request, job details and service copies of the court-related documents at step 45.

Figure 4:
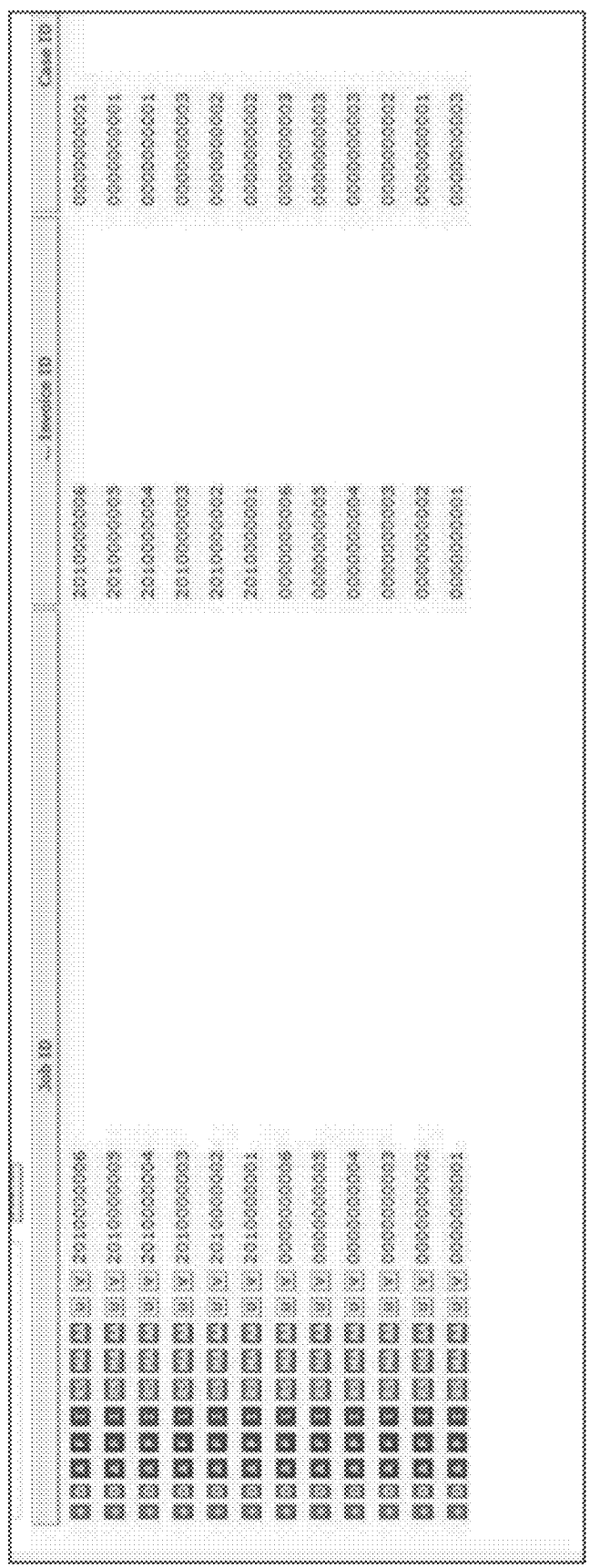
FIG. 4 is a screen shot of a program carrying out the system of the present invention.

The database maintained by the SC would likewise contain a listing of all accepted jobs, the PS to which the job has been assigned, as well as all job-related details and court-related documents. FIG. 4 is a screen shot illustrating the possible graphical organization of such information within the database. As illustrated, a particular job would be referenced by Job ID, Invoice ID, and Case ID. Hyperlinks would likewise be provided to permit the SC to access any documents associated with a job. These documents may include, for example, invoices to the LSP, requests for service, affidavits of service, field sheets from the PS detailing service attempts, the payment history of the LSP, and/or uploaded attachments. This interface allows the SC to organize and keep track of a number of different jobs over time.

Turning back to FIG. 1, prior to attempting service of the court-related documents, the SC would deliver the documents to the COC at step 48. It is envisioned that this would most likely be carried out by way of the court-sponsored e-filing system. Namely, the documents to be served would be provided to the COC via the e-filing system. The COC would thereafter issue service copies of the documents in a conventional fashion at step 52. The COC would then provide service copies of the court-related documents to the SC. Conformed copies would also be provided to the LSP. The SC, in turn, provides the service copies of the court-related documents to the PS for service of process. In an alternative embodiment, the individual PS could directly retrieve the service copies of the documents via the e-filing system at step 54.

With the service copies of the documents in hand, the PS would then attempt service upon the third party in accordance with traditional methods at step 56. The PS can provide electronic status updates regarding the attempts to serve the documents. This could be accomplished by the PS logging into the SC program/database via personalized login credentials and manually inputting the service and/or attempt history data. In addition the status updates could also be provided to the SC for input. Regardless, the data once entered will be available to the LSP via the network.

Finally, once service is effected, the PS would generate an affidavit of service at step 58. This affidavit can be electronically signed by the PS. Such an affidavit could be delivered directly to the LSP via the network. The signed affidavit can also be electronically sent to the COC for filing. It is also envisioned that the SC would obtain a copy of the affidavit of service for storage in the host database.

FIG. 1 also illustrates two additional modules that can be used with the system. These include an invoicing module 62 and an archiving module 64. These modules are described next in conjunction with FIGS. 2 and 4.

Invoicing Module

Figure 2:
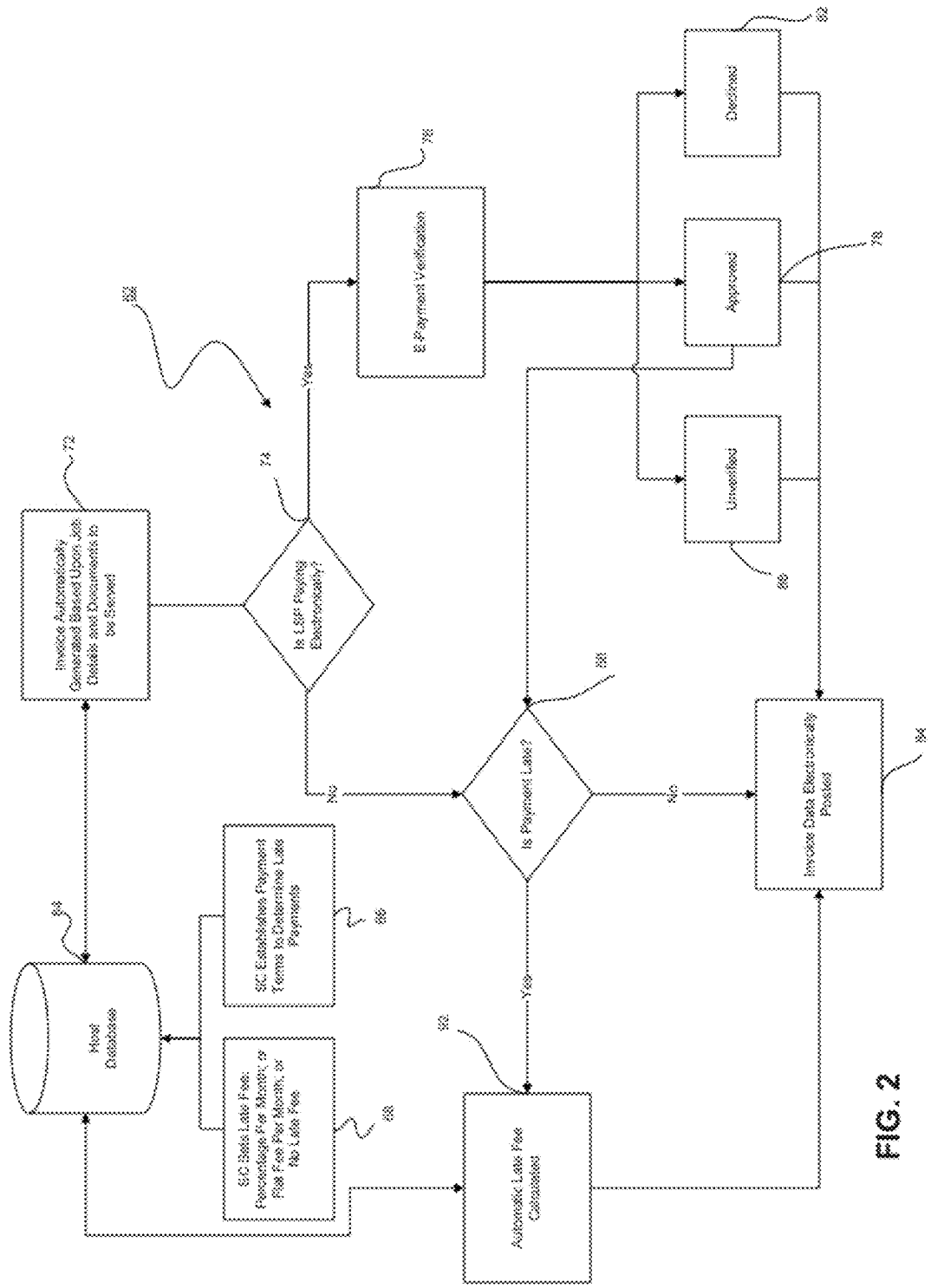
FIG. 2 is a flow chart illustrating the automated invoicing feature of the present invention.

The invoicing module 62 automatically invoices an LSP and processes any invoice payments. With reference to FIG. 2, it is shown that the module utilizes a database 64, which contains payment terms that are previously established by the SC at steps 66 and 68. These payment terms may include the amounts to be charged for various jobs. These amounts would be based, in part, on the job details and the court-related documents to be served. The payment terms stored in the database further include when the invoice is payable and the applicable late fee. The module thereafter automatically generates an invoice to an LSP at step 72 on the basis of an accepted job. Again, the invoice is automatically generated in accordance with the established payment terms stored in database 64.

Thereafter, the module automatically determines whether the LSP is providing an electronic payment over the network at step 74. If such an electronic payment is being made, the SC verifies the payment at step 76. Namely, the SC either approves the payment at step 78 or declines the payment at step 82. The approval or lack of approval is reflected by an electronically updated invoice at step 84. Likewise, if the e-payment has neither been approved nor declined but is rather unverified, such as at step 86, this information, too, is electronically posted to the invoice at step 84.

Thereafter, whether the LSP is paying electronically or otherwise, the module automatically determines whether the invoice payment is late at step 88. This determination is made with reference to the established payment terms stored in the database. If the determination is made that the payment is late, an automatic late fee is computed by the module at step 92, with the late fee being computed in accordance with the established payment terms. Finally, the LSP is provided an updated invoice at step 84 which can be either electronically delivered to the LSP or posted to the database to be accessed by the LSP at a later time. This electronic invoice is updated to reflect approved or declined electronic payments, the delinquent status, and the applicable late fees.

Archiving Module

Figure 3:
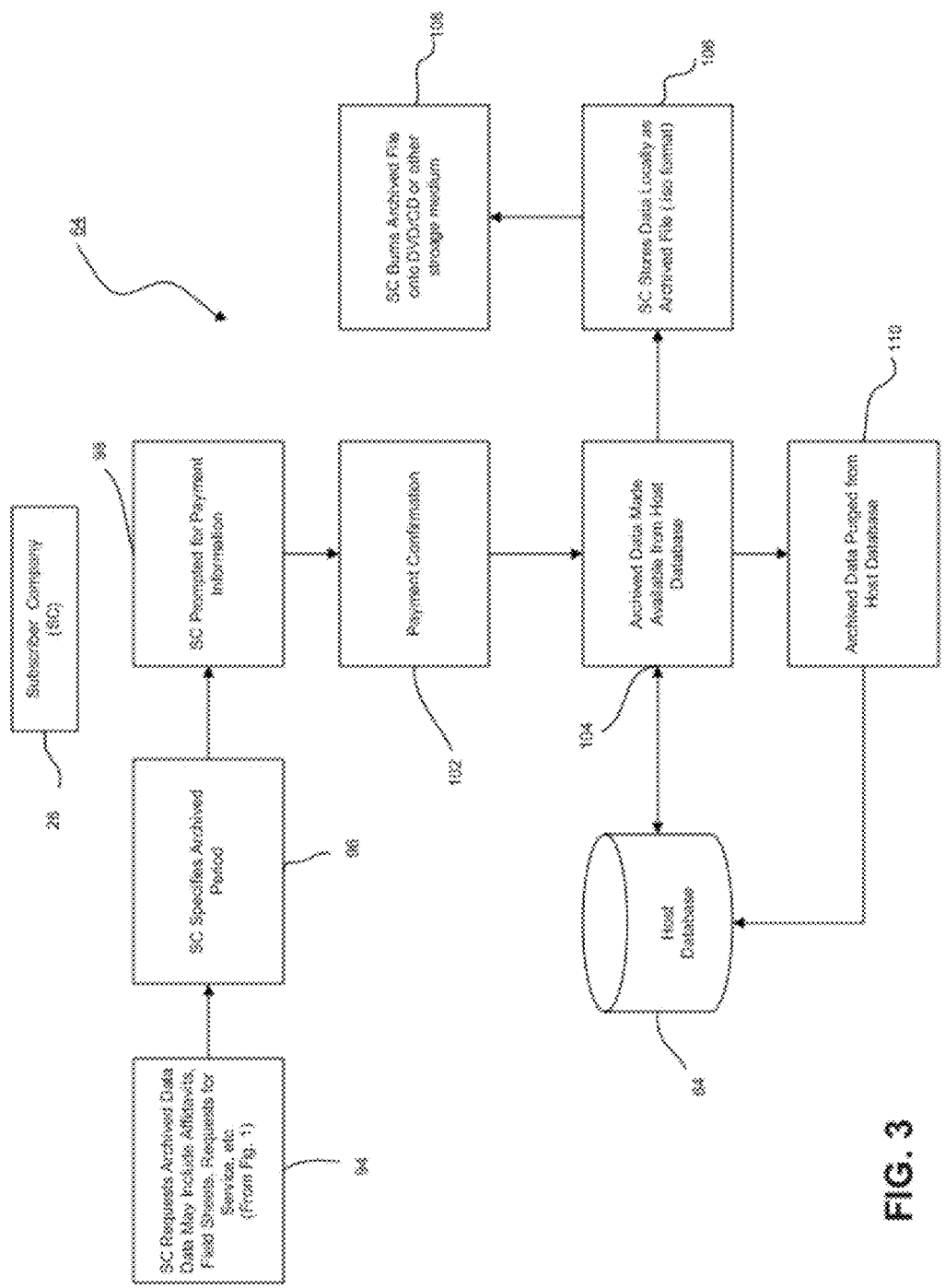
FIG. 3 is flow chart illustrating the archiving feature of the present invention.

With reference to FIG. 3, the archiving module permits the SC to access and store archived data relating to prior job requests. The historical data to be archived may include, but is not limited to, job details, court-related documents, field sheets, affidavits of service, requests for service, uploaded attachments, and invoicing and payment information. The uploaded attachments can include any type of file, such as pictures, videos, website, or sound files. This archived data is initially stored in a host database.

The archiving module accepts a request for archived data from the SC at step 94. Thereafter, the SC is prompted to specify an archived period at step 96. This archived period may be, for example, a week, a month, quarterly, semi-annually, annually or multiple years. The SC is prompted for payment at step 98 before gaining access to the archived data. The amount of payment required depends, in part, upon the length of the archive period specified. This payment is larger for larger archived periods and is smaller for smaller archived periods. Likewise, the payment may also depend, in part, upon the total volume of archived data requested.

In the next step 102, the SC provides an electronic payment. This payment is made directly to the system host. Once payment is confirmed, at step 104, the SC is permitted to access to download the archived data. Thereafter, the SC is permitted to store the downloaded data locally, at step 106. This can be done by either storing the archived data on a hard drive, a flash drive, a CD, or a DVD, or on any other type of storage medium (note step 108). It is envisioned that the archived data would be stored in an archived .ISO file format and then burned and saved by the SC to a CD or a DVD, or on any other type of storage medium such as a hard drive and/or a flash drive. Finally, once the data is downloaded from the host database, it can be erased by the host to conserve storage capacity at step 110.

FIG. 5 is a screen shot from a program running the archiving module. This allows the SC to easily see and access all archived data. The screen includes columns for "Job ID", "Client", "Server", and "Person/Corporation to be Served." Also included are hypertext links to all archived documents. These documents may include, but are not limited to, Affidavits of Service "A," Field Sheets "F," Invoices "I," Requests for Service "RS," and Mailing Affidavits "MA." Other attachments, which can be in any of a variety of formats, can be downloaded and stored via the archiving module as well. By clicking on the view "V," link the user is presented with a listing of all uploaded attachments. Thereafter, by clicking on an individual item in the list, the uploaded attachment can be viewed. The information on the screen can also be sorted by clicking on an individual column heading. For example, clicking on the "Job ID" column, the jobs are arranged in numerical order of the Job ID. Searching can also be carried out via a quick search feature. This allows searching of documents, Job IDs, Clients, Servers or Persons/Corps. to be served. Moreover, as letters are typed into the quick search field, irrelevant data will be removed from the screen.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described, what is claimed is:

1. A method for managing, distributing, and serving court-related documents, the method being carried out by a number of different entities, including subscriber companies (SC), law service providers (LSP), clerks of court (COC), and process servers (PS), with each of the entities communicating over a computer network and a court sponsored e-filing system, the method comprising the following steps:

the SC receiving a job request, job details, and court-related documents from an LSP over the network;

the SC either accepting or declining the job request based upon the job details and the court-related documents;

notifying the LSP via the network whether the SC has declined or accepted the job request;

providing a database accessible by the SC, the database including a listing of various PS in different geographic areas;

the SC assigning an accepted job request to a particular PS, updating the database to reflect that the particular SC has been the accepted job request;

the database graphically listing all accepted jobs, the assigned PS, the job details, the court-related documents, and any uploaded attachments;

the SC delivering the court-related documents for an accepted job to the COC via the court sponsored e-filing system, the COC issuing service copies of the court-related documents;

delivering the job request, job details, and service copies of the court-related documents to the assigned PS via the network;

the PS retrieving the service copies of the court-related documents from the SC via the network;

the PS attempting to serve the service copies of the court-related documents, the PS logging into the database via personalized login credentials and inputting information regarding the PS' attempted service;

after completing the service of the court-related documents, the PS generating an affidavit of service and affixing his/her electronic signature, the affidavit of service thereafter delivered to the LSP via the network.

2. The method as described in claim 1, further comprising an automated invoicing module for automatically invoicing an LSP and processing invoice payments from an LSP, the invoicing module carrying out the following steps:

provide a database of payment terms established by the SC, the payment terms including amounts to be charged on the basis of job details and the court-related documents, the payment terms further including when the invoice is payable and the applicable late fee;

generating an invoice for an LSP on the basis of an accepted job, the invoice being automatically generated in accordance with the established payment terms;

determining whether the LSP providing an electronic payment and permitting the SC to either approve or decline the electronic payment;

determining whether the invoice payment from the LSP is late by referencing the established payment terms;

automatically computing the late fee in the event the invoice payment is late, the late fee being computed with reference to the established payment terms;

electronically delivering an updated invoice to the LSP, the updated invoice reflecting approved or declined electronic payments, and applicable late fees.

3. The method as described in claim 1 further comprising an archiving module for permitting a SC to access and store archived data relating to job requests, the historical data including job details, court-related documents, field sheets, affidavits of service, requests for service, uploaded attachments, and invoicing and payment information, the archived data initially being stored in a host database, the archiving module carrying out the following steps:

accepting a request for archived data from a SC and prompting the SC to provide an archived period;

prompting the SC for payment, the payment being determined, in part, on the basis of the archived period;

accepting and confirming payment from the SC;

permitting the SC to download the archived data once payment is accepted and confirmed;

permitting the SC to access and store the downloaded data locally in an archived file format;

erasing the downloaded data from the host database after it has been accessed by the SC.

* * * * *